United States Patent [19]

Rosenbaum

[11] 3,928,922

[45] Dec. 30, 1975

[54] INSTRUCTIONAL AID DEVICE

[76] Inventor: Peter S. Rosenbaum, 425 Riverside Drive, New York, N.Y. 10025

[22] Filed: May 15, 1974

[21] Appl. No.: 469,958

[52] U.S. Cl. .................................. 35/9 R; 35/31 A
[51] Int. Cl.² .......................................... G09B 3/02
[58] Field of Search ........ 35/31 R, 31 A, 31 G, 9 R, 35/9 E

[56] References Cited
UNITED STATES PATENTS

| | | | |
|---|---|---|---|
| 1,525,696 | 2/1925 | Spencer | 35/9 E UX |
| 1,644,160 | 10/1927 | Thompson | 35/9 R UX |
| 2,551,083 | 5/1951 | Angell et al. | 35/9 R |
| 3,387,391 | 6/1968 | Bartolo | 35/31 G |
| 3,456,364 | 7/1969 | Alexander | 35/31 G |
| 3,523,376 | 8/1970 | Gilliam et al. | 35/31 A |

Primary Examiner—Wm. H. Grieb
Attorney, Agent, or Firm—Edward F. Levy

[57] ABSTRACT

An instructional aid device for use by a pair of students includes a jacket having front and rear panels with a puncturable membrane such as a sheet of paper mounted between the panels. A series of study problems are displayed successively at the front panel and the identical problems are presented at the rear panel with the correct answers also included. The front and rear panels are formed with registering apertures which are aligned with each of the problems and are sized to permit the insertion of a tool therethrough for puncturing the paper adjacent a selected problem if the correct answer to the problem is given. One student can thus test the other student and score the correctness of the answers given. In one embodiment, a circular disc, having the problems printed on its opposite faces, is rotatably mounted in the jacket, with the problems successively displayed in aligned windows formed in the front and rear panels of the jacket.

8 Claims, 7 Drawing Figures

FIG. 2
FIG. 3
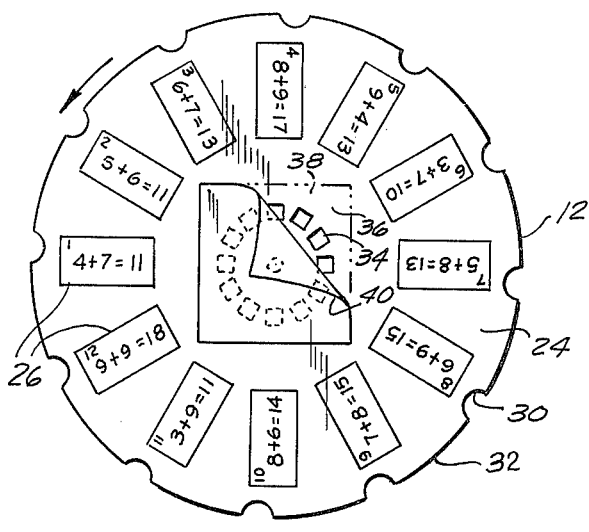
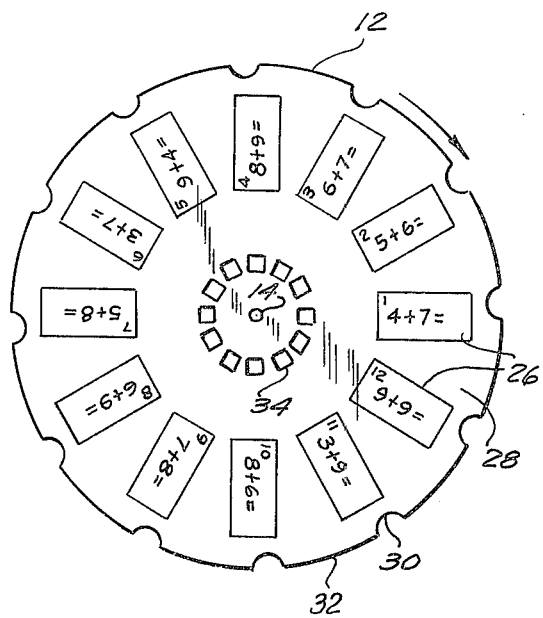
FIG. 4
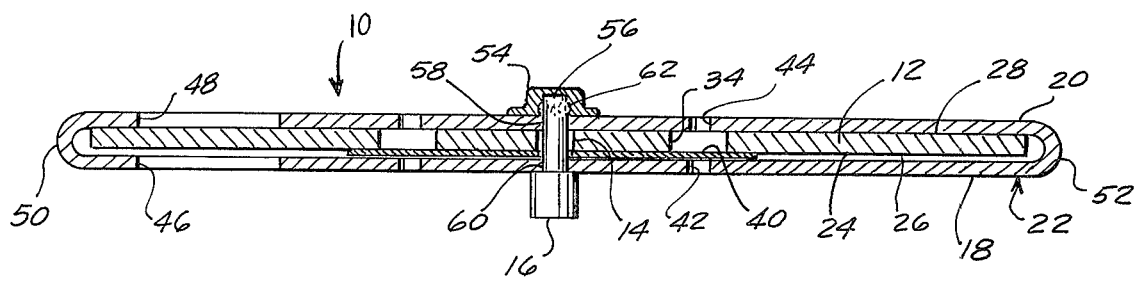

FIG. 5
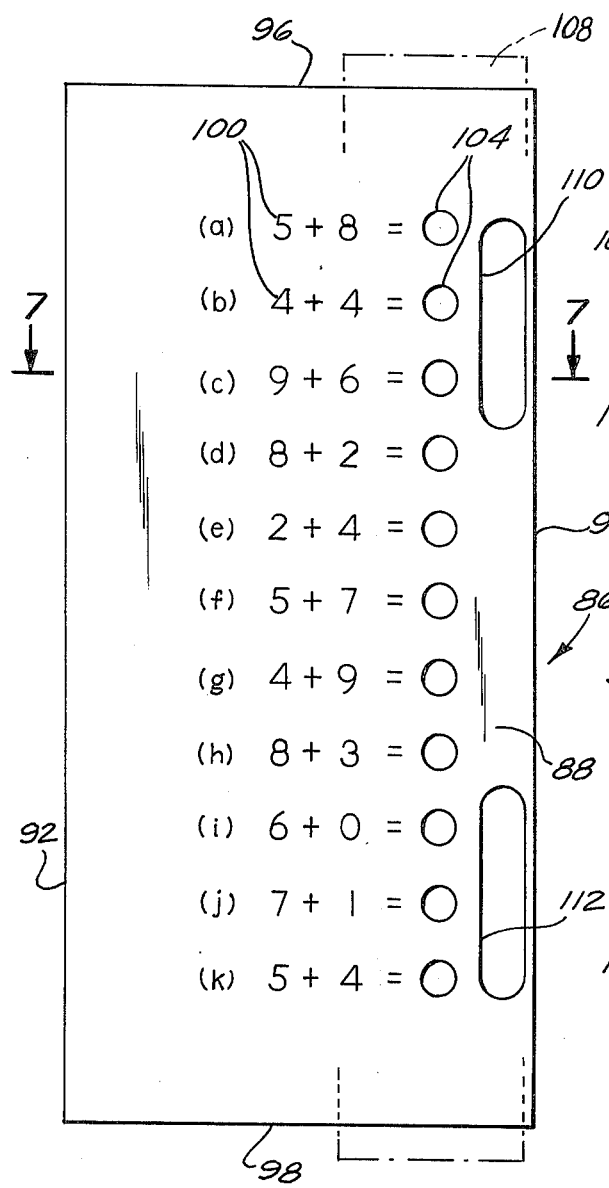
FIG. 6
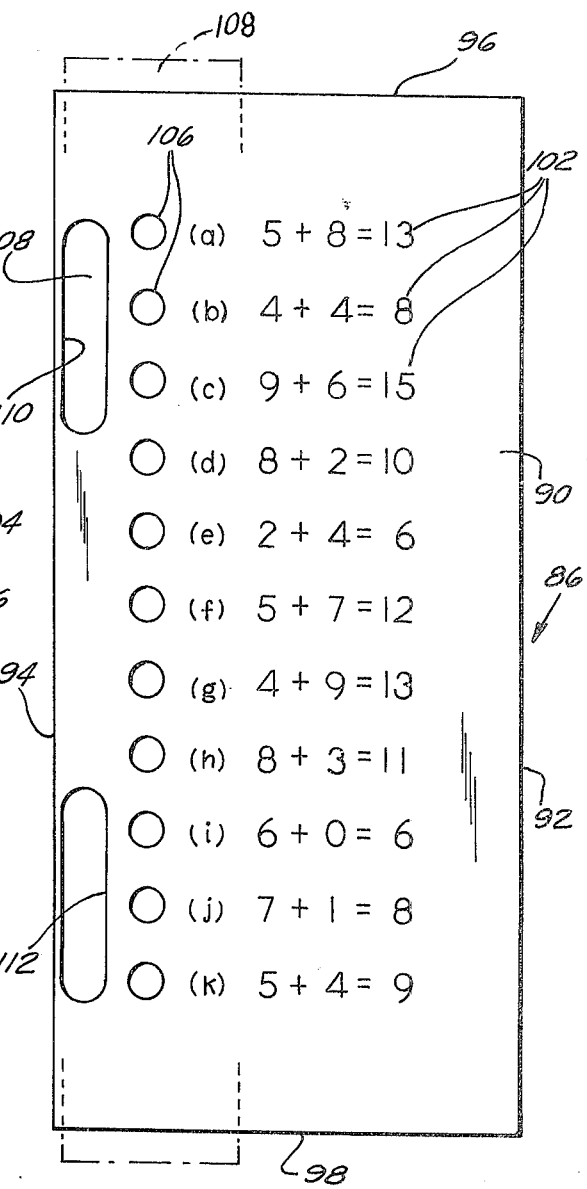
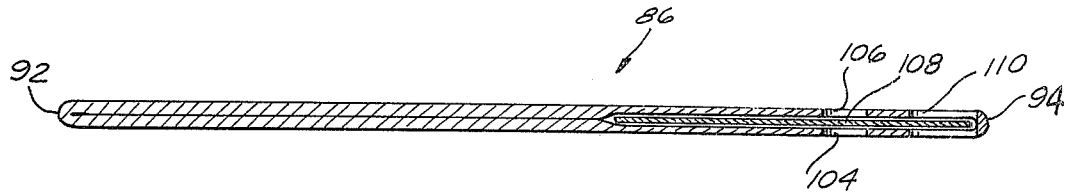
FIG. 7

INSTRUCTIONAL AID DEVICE

The present invention relates to instructional aid devices which are adapted to present to a student of elementary or secondary school level a series of problems, and to score the answers as correct or incorrect as they are given by the student. The problems and their correct answers are displayed at the rear surface of the device so that they are visible to the person doing the testing. Thus another student at the same grade level may do the testing and may score the answers as correct or incorrect, even though he may not have been previously aware of the answer.

The instructional aid devices of the present invention are particularly devised for use in conjunction with a prevailing theory of educational instruction in which students are assigned to teams, usually groups of two, and work together in studying, drilling each other, and testing each other. These instructional aid devices enable one student to drill or test another in a series of problems in such subjects as mathematics, spelling, word definitions, geography, history or the like, by displaying the problems in sequence and scoring the correctness of the answers. For the purpose of scoring, a sheet of paper, removably mounted in the device, is punched adjacent the problem if the correct answer is given by the student being tested. If the device is being used for testing, the sheet of paper is removed at the conclusion of the test and is retained as a permanent record for grading by the teacher or instructor. If the device is being used for drilling, the problems which are not punched may be repeatedly presented to the student until all have been correctly answered.

In accordance with the invention herein, there is provided an instructional aid device comprising a sturdy jacket within which is mounted a sheet of paper or other material which may be easily punctured, with apertures in the jacket through which a pencil or similar tool may be inserted to punch through the paper sheet. A series of problems are displayed at the front of the jacket in successive order to a student being tested, while the same problems, together with their correct answers, are simultaneously displayed at the rear of the jacket to the student performing the testing. The latter student is thus apprised of the correct answer and can score the answer given by punching through the adjacent aperture if the given answer is correct, or the student being tested may do the punching.

In one preferred embodiment of the invention, the device is in the form of an instructional wheel device in which a circular disc is mounted rotatably within the jacket. The disc has a series of problems printed in a circular row on each of its faces. Each problem on one face is in registry with an identical problem on the opposite face, except that the problems on one face include the correct answers. The front and rear panels of the jacket contain aligned windows through which a single problem is displayed at the front of the device while the identical problem with its answer is displayed at the rear of the device. At the center of the disc there is provided a circular row of apertures covered by a sheet of paper or other frangible material, these apertures registering with corresponding apertures in the front and rear panels of the jacket, so that a pencil or similar tool may be used to puncture the sheet of paper adjacent the problem if the correct answer is given.

Accordingly, it is an object of the present invention to provide an instructional aid device for use by a pair of students which presents a plurality of problems successively to one of the students while presenting the identical problems including the correct answers to the other student.

Another object of the present invention is to provide an instructional aid device which includes means for recording correct answers given by a student.

Still another object of the invention is the provision of an instructional aid device which can be used by a pair of students either for drilling each other in selected studies, or for testing each other, even though neither student may have previous knowledge of the answers to the problems presented.

A further object of the present invention is to provide an instructional aid device which can be hand-held and can be easily manufactured at relatively low unit cost.

Included among the advantages of the instructional aid device in accordance with the present invention is the creation of a progressive record of the correct and incorrect answers by the student being tested. This record is constantly visible to the student being tested so that his correct answers are rewarded and are consequently reinforced. The rate at which the testing proceeds can be adapted for each individual student since the rate is controlled both by the student doing the testing and the student who is being tested. The student who is doing the testing derives status from his role and this status is shared since the roles of the pair of students are reversed after all of the problems on the wheel have been presented. The teacher can collect the small squares of paper from the devices of a relatively large group of pairs of students using the instructional aid device in accordance with the present invention and can thus obtain a record of each student's progress without the need for a written examination or individual monitoring by the teacher. This record of progress can also be easily obtained for students whose level of writing skills is such that they have difficulty writing answers to problems in a conventional written examination.

Additional objects and advantages of the invention will become apparent during the course of the following specification when taken in connection with the accompanying drawings in which:

FIG. 2 is a front plan view of the inner wheel of the instructional aid device of FIG. 1 showing a series of problems, including the answers printed thereon and with a square sheet of paper covering the central portion of the wheel, with the paper sheet partially lifted to reveal a circular row of square apertures;

FIG. 3 is a rear plan view of the wheel of FIG. 2 showing the identical problems, without answers, printed thereon;

FIG. 4 is a sectional view on an enlarged scale, taken along the line 4—4 in FIG. 1;

FIG. 5 is a front plan view of another embodiment of instructional aid device made in accordance with the present invention;

FIG. 6 is a rear plan view of the device shown in FIG. 5; and

FIG. 7 is a section taken along line 7—7 in FIG. 5.

Figure 1:
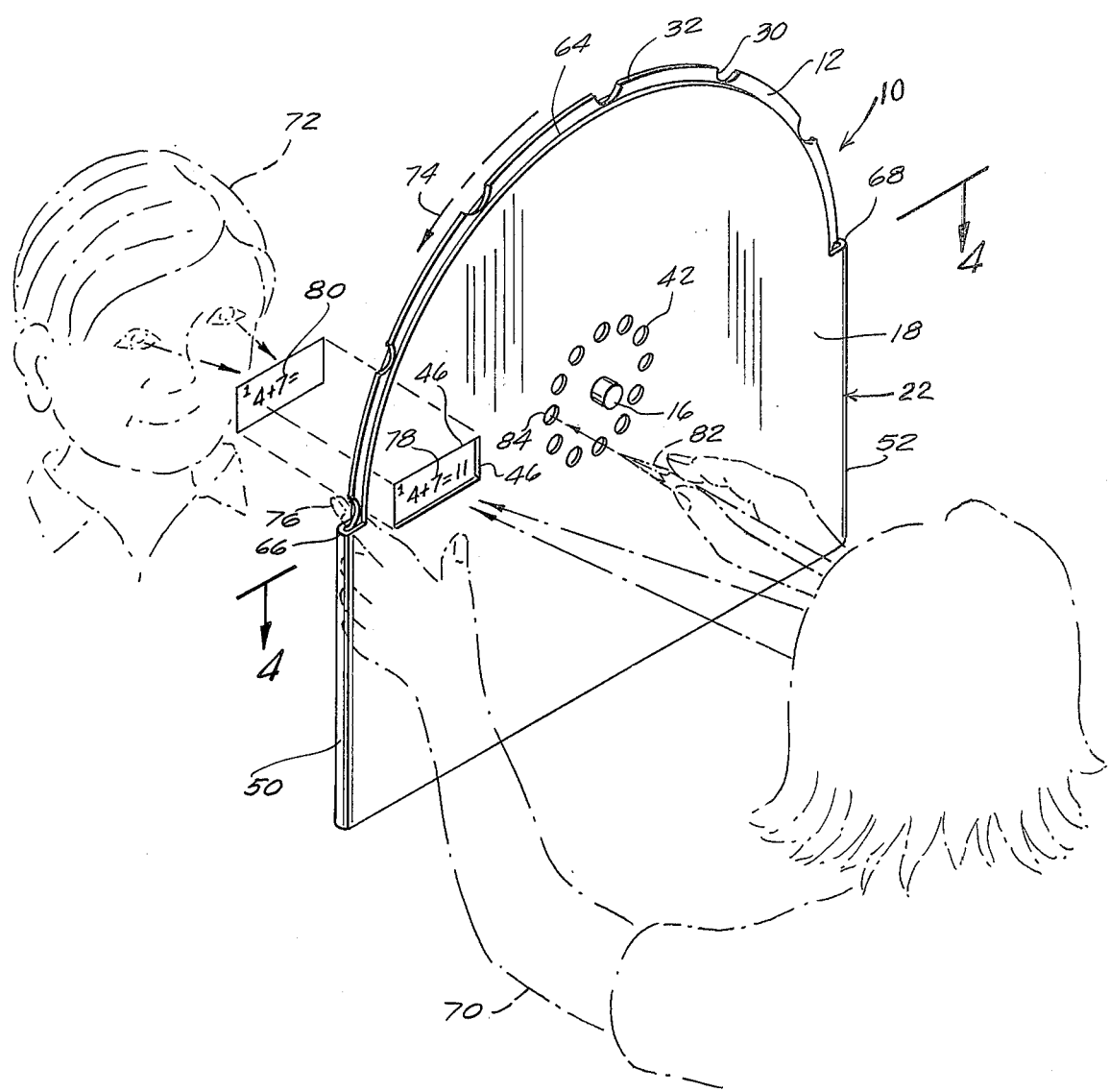
FIG. 1 is an overall perspective view of a preferred embodiment of instructional aid device made in accordance with the present invention, shown in use by a pair of students.

Referring in detail to the drawings, there is shown in FIG. 1 an instructional aid device 10 made in accordance with the present invention. A circular disc or wheel 12 has a central hole 14 and is rotatably mounted on a removable central axle 16 between a front panel 18 and a rear panel 20 of a jacket 22. The wheel 12 comprises a circular disc of relatively heavy material such as cardboard and has a circular row of problems printed on the first side 24 with each problem positioned within one of a plurality of printed rectangles or frames 26 each of which is numbered in sequence. For purposes of illustration, the problems are shown as simple addition problems, although the subjects will vary as desired. Each of the problems on first side 24 of the wheel 12 is in registry with an identical problem printed on the opposite side 28 of the wheel 12 and likewise each of the numbered frames 26 on the first side 24 of the wheel 12 is in registry with an identically numbered frame 26 on the second side 28 of the wheel 12 except that the problems printed on the first side 24 of the wheel 12 also have the correct answer included. Twelve numbered frames 26 are shown by way of example in FIG. 2 and FIG. 3, although the number of frames 26 and problems printed on the wheel 12 may be varied for convenience.

The wheel 12 includes a plurality of semi-circular notches 30 on its outer edge 32 with each notch 30 disposed in alignment with a radius line passing through the center of one of the frames 26. The wheel 12 also includes a circular row of square apertures 34 each one located along a radius line passing through the center of one of the frames 26 and each one disposed between the frames 26 and the central hole 14. Thus the apertures 34 correspond in number to the number of the frames 26, and each aperture is radially aligned with a respective frame.

A central area 36 on the first side 24 of the wheel 12 is coated with a pressure sensitive adhesive 38. A square of paper 40, or other membrane which can be readily punctured, is retained by the pressure sensitive adhesive 38 as shown in FIG. 2. The area 36 and the square of paper 40 are of such sufficient size that all of the square apertures 34 are completely covered by the square of paper 40. The pressure sensitive adhesive 38 and the square of paper 40, which may be coated with a release compound are of a type which permits the repeated adhesion and removal of different squares of paper for a purpose which will be presently described. The release compound may be one of a number of known types including waxlike and silicone compounds.

The front panel 18 and the rear panel 20 of the jacket 22 each have a circular row of holes 42 and 44 in registry with each other and also in registry with the circular row of square apertures 34 in the wheel 12. The front panel 18 has a rectangular window 46 cut therein and the rear panel 20 has formed therein a corresponding rectangular window 48, with the front and rear windows 46 and 48 in alignment and with each one slightly larger in dimension than the frames 26 printed on the wheel 12.

The holes 42 and 44 in the jacket 22 and the front and rear windows 46 and 48 in the jacket 22 are disposed so that the wheel 12 can be turned on the central axle 16 to simultaneously display a problem in the front and in the rear apertures 46 and 48 and when a problem is so displayed, the holes 42 and 44 in the jacket 22 are in registry with the square apertures 34 in the wheel 12.

The front and rear panels 18 and 20 of the jacket 22 are shown in FIGS. 1 and 4 as being joined along side edges 50 and 52. The wheel 12 can be removed from the jacket 22 for the purpose of changing the square of paper 40 or replacing the wheel 12 with a different wheel having different problems printed thereon. Removal of the wheel is accomplished by means of the construction of the central axle 16 which is preferably in the nature of a rivet having a retaining cap 54 snap mounted at one end 56 thereof. By removing the retaining cap 54 from the end 56 of the central axle 16 and withdrawing the central axle from holes 58 and 60 in the jacket 22, the wheel 12 may be removed from the jacket 22. The central axle 16 includes a protuberance 62 which engages and aids in retaining the retaining cap 54.

The upper edge 64 of the front panel and of the rear panel has the shape of a circular arc having a radius smaller than the radius of the wheel 12 so that the outer edge 32 of the wheel 12 and the semi-circular notches 30 protrude beyond the jacket 22. This aids the student doing the testing to turn the wheel 12 in such a manner that successive problems are displayed in the windows 46 and 48, as will be presently described. The arcuate upper edge 64 of the jacket panels terminates in horizontal shoulders 66 and 68 which are positioned slightly below a horizontal radius line extending through the center of the aperture 46.

The jacket 22 and the wheel 12 may be manufactured in any one of a number of suitable materials which provide sufficient strength, stiffness, economy of manufacture and in the case of the wheel 12 the ability to accept printed markings. Included among these suitable materials are cardboard, pressboard and plastic.

In use, one of the students 70, who is to do the testing or drilling, but who need not know the answers to the problems, holds up the instructional aid device 10 in front of the other student 72 with the wheel surface 28, bearing the problems as well as the answers, facing the student 70. The student 70 turns the wheel 12 in the direction shown in the arrow 74 in FIG. 1 using one of his fingers 76 inserted in one of the semi-circular notches 30 until one of the problems 78 with answer included, preferably the problem in frame 1, is centered in the window 46 which faces him, as shown in FIG. 1. The horizontal shoulder 66 of the jacket 22 acts as a stop and is so positioned relative to the notches 30 that when the finger in a notch reaches the shoulder 66 and is stopped thereby, the adjacent problem will be centered in the window 46. When the problem 78 including the answer is centered in the front window 46, the identical problem 80, without the answer, is centered in the rear window 48 in the rear panel 20 and is visible to the student 72 being tested. The problem 78 in frame number one shown, by way of examlpe, in FIG. 1 is "4 + 7 =   ". The student 70 doing the testing sees the problem 78 and the answer in frame number one, "4 + 7 = 11," while the student 72 being tested sees only the problem 80, "4 + 7 =  ," in window 48. If the student 72 gives the correct answer to the problem 80, then the student 70 pushes a pencil 82 or similar tool through the hole 84 in the front panel 18 which is in line with the front window 46. The pencil 82 punctures the square of paper 40 forming a record that a correct answer has been given and the point of the pencil becomes visible to the student 72 thus indicating to him that his answer is correct. If the student 72 gives an incorrect answer, then the student 70 does not push his pencil 82 through the hole 84 but proceeds to turn the wheel 12 in the direction shown by the arrow 74 to make the next problem visible and so on, in turn, until all of the problems have been presented. A glance at the circular rows of holes 42 and 44 in the jacket 22 will then indicate which problems have been answered correctly and which problems have not, since incorrectly answered problems are indicated by the unpunched paper which is visible through the corresponding hole in the jacket 22. At that time the student 70 may rotate the wheel 12 so that the previously incorrectly answered problems are again presented to the student 72 or he may remove the wheel 12 from the jacket 22, remove the square of paper 40, attach a fresh square of paper to the adhesive coated area 36 and reinstall the wheel 12 into the jacket 22. The students 70 and 72 then exchange roles with the student 72 now doing the testing and student 70 now answering the problems. The previously used square of paper 40 is retained and may be presented to a teacher who can quickly grade the performance of the student 72 by noting the number of problems answered correctly in accordance with the number of holes in the square of paper 40.

The problems 78 illustrated in the drawings are arithmetic problems and are shown only by way of example since the use of the instructional aid device 10 in accordance with the present invention is not limited to the field of mathematics. The instructional aid device 10 may be used in all fields of instruction where the subject matter can be presented in the form of a plurality of problems or questions printed on one side of a wheel, with the same problems or questions together with the corresponding answers printed on the opposite side of the wheel. The removable feature of the wheel 12 makes it possible to change wheel 12 for wheels having problems of different levels of difficulty and it is possible for students to use the same jacket 22 throughout the school day, changing the wheels for wheels having different subject matter printed thereon as the school day progresses.

FIGS. 5, 6 and 7 show a modified embodiment of the instructional aid device which is of simpler form. In this embodiment of the instructional aid device which is of simpler form. In this embodiment, the device comprises a jacket 86 formed of a pair of rectangular panels 88 and 90 made of cardboard, plastic or similar material. The panels are joined at their side edges 92 and 94, but are open at their top and bottom ends 96 and 98.

A vertical column of problems 100 are printed on the rear panel 88 of jacket 86, while a column of identical problems 102, with correct answers included, are printed on the front panel 90. The front and rear panels 90 and 88 are each formed with a respective vertical row of apertures 104 and 106, the apertures of the two rows registering with each other. Each of the apertures is aligned with one of the problems printed on the jacket.

The open top and bottom ends 96 and 98 of jacket 86 permit the insertion of a sheet of paper 108 within the jacket. To aid in the insertion of the paper sheet 108, the front and rear panels are provided with cut-out elongated slots 110 and 112 along side edge 94. The slots 110 and 112 provide finger openings through which the inserted paper sheet 108 may be grasped and slid into registry with the jacket 86. The paper sheet 108 is of approximately the same size as the interior of jacket 86, and when fully inserted therein, lies between the rows of apertures 104 and 106.

The device of FIGS. 5, 6 and 7 is used in substantially the same manner as the embodiment previously described. The student doing the testing holds the jacket 86 with the column of problems and their answers 102 facing himself, and with the column of problems 100, without answers, facing the student being tested. The student being tested starts at the top of the column and attempts to answer the problems in succession. When an answer is given, the student doing the testing can see the correct answer on his side of the jacket, and proceeds to score the answer, if correct, if inserting a tool such as a pencil through the apertures 104 and 106 adjacent the respective problem. As an alternative, the student doing the testing may advise that the answer is correct, and the student being tested may punch through the appropriate aperture from his side. This punches the paper sheet 108 adjacent the problem if the correct answer is given. After all of the problems have been presented, the sheet may be removed and given to the teacher for grading, or the incorrectly answered problems can be repeated until all have been answered correctly.

While preferred embodiments of the invention have been shown and described herein, it is obvious that numerous omissions, changes and additions may be made in such embodiments without departing from the spirit and scope of the invention.

What is claimed is:

1. An instructional aid device comprising a jacket including a front panel and a rear panel, means for visually displaying a first set of problems with answers at the front panel and simultaneously displaying a second, identical set of problems without answers at said rear panel, the problems of said first set being in registry with identical problems of said second set, a row of holes formed in said front panel with each hole in alignment with an adjacent problem, a row of holes formed in said rear panel in alignment with the respective holes in said front panel, a sheet of frangible material, and means for removably mounting said sheet between said front and rear panels with said sheet underlying said rows of holes, said aligned holes being sized for insertion of a punching tool therethrough from the side of the device displaying the problems with answers, whereby to puncture said sheet adjacent each problem which has been correctly answered, the punctured sheet being removable from said jacket for grading the answers represented by the punctures therein.

2. An instructional aid device according to claim 1 which also includes a disc and means rotatably mounting said disc between said front and rear panels, said disc having a front surface with said first set of problems arranged in a circular row thereon, and a rear surface with said second set of problems arranged in a circular row thereon, a window in said front panel sized to display therethrough a single problem of said first set, and a window in said second panel in registry with the window of said first panel and sized to display therethrough simultaneously the identical single problem of said second set, and a plurality of apertures in said disc positioned to register with the respective holes in said front and rear panels when a problem is displayed in said windows.

3. An instructional aid device according to claim 2 in which said rotatable mounting means is formed of two interfitting parts which may be disassembled for removing said disc from between said panels.

4. An instructional aid device according to claim 2 in which said disc is formed with a circular row of apertures adjacent the center thereof, the holes in said front and rear panels being also arranged in circular rows and located to register with the apertures in said disc.

5. An instructional aid device according to claim 4 in which the apertures in said disc are each disposed along a radius line leading to one of said problems.

6. An instructional aid device according to claim 4 in which said frangible sheet comprises a sheet of paper, said device also including means for mounting said sheet at the center of said disc in a position overlying the central circular row of apertures.

7. An instructional aid device according to claim 6 in which said mounting means comprises a localized coating of pressure sensitive material on said disc.

8. An instructional aid device according to claim 6 in which each of said apertures in said disc and each of said holes in said front and rear panels is sized to receive a tool inserted therethrough for puncturing said paper sheet in the area adjacent the problem displayed in the windows of said panels.

* * * * *